United States Patent [19]

Hopper

[11] Patent Number: 5,756,590
[45] Date of Patent: May 26, 1998

[54] PROCESS FOR PREPARATION OF N-HALOTHIOSULFONAMIDE MODIFIED TERPOLYMERS

[75] Inventor: Roger John Hopper, Akron, Ohio

[73] Assignee: The Goodyear Tire & Rubber Company, Akron, Ohio

[21] Appl. No.: 726,593

[22] Filed: Oct. 7, 1996

Related U.S. Application Data

[63] Continuation of Ser. No. 406,428, Mar. 20, 1995, abandoned.

[51] Int. Cl.$^6$ .................................................. C08C 19/22
[52] U.S. Cl. ............................................................ 525/351
[58] Field of Search ................................................ 525/351

[56] References Cited

U.S. PATENT DOCUMENTS

| | | | |
|---|---|---|---|
| 4,820,780 | 4/1989 | Hopper | 525/351 |
| 4,910,266 | 3/1990 | Hopper | 525/351 |
| 5,017,662 | 5/1991 | White | 525/351 |
| 5,037,896 | 8/1991 | Datta | 525/351 |

*Primary Examiner*—Christopher Henderson
*Attorney, Agent, or Firm*—Alvin T. Rockhill

[57] ABSTRACT

The subject invention discloses a process for preparing an N-chloro(or bromo)thio-sulfonamide-modified terpolymer which comprises reacting:

(a) a terpolymer of ethylene, an α-olefin containing from 3–16 carbon atoms, and 5-ethylidene-2-norbornene, with (b) an N-chloro(or bromo)thio-sulfonamide of the formula:

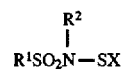

wherein $R^1$ and $R^2$ are selected from the group consisting of alkyl radicals having 1 to 20 carbon atoms, aralkyl radicals having 7 to 20 carbon atoms and aryl and substituted aryl radical having 6 to 10 carbon atoms and wherein $R^1$ is also selected from radicals having the formula:

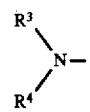

wherein $R^3$ and $R^4$ are individually selected from said alkyl, aralkyl, aryl and substituted aryl radicals and wherein $R^3$ and $R^4$ can be joined together to represent radicals selected from

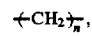

where n is an integer of 4 to 7, and

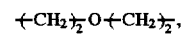

and wherein X is selected from chlorine and bromine; in the presence of at least a stoichiometric amount of a hydrohalic acid acceptor.

3 Claims, No Drawings

1
PROCESS FOR PREPARATION OF N-HALOTHIOSULFONAMIDE MODIFIED TERPOLYMERS

This is a Continuation of application Ser. No. 08/406,428, filed on Mar. 20, 1995, now abandoned.

BACKGROUND OF THE INVENTION

The reactions of N-chlorothio-sulfonamides with rubbery ethylene-(α-olefin)-non-conjugated diene terpolymers have been described in U.S. Pat. No. 3,915,907, U.S. Pat. No. 3,970,133, U.S. Pat. No. 4,820,780 and U.S. Pat. No. 4,910,266. The resulting modified terpolymers exhibit enhanced co-vulcanizability in blends with highly unsaturated rubbers such as natural rubber, styrene-butadiene rubber or acrylonitrile-butadiene rubber. In preferred embodiments, the modified terpolymer is a modified ethylene-propylene-diene termonomer (EPDM) rubber and the end use is in ozone-resistant tire sidewalls.

In the aforementioned patents, it was disclosed that some EPDMs exhibit undesirable viscosity increases as the level of modification is increased. Within this category are the widely used commercial EPDMs containing 5-ethylidene-2-norbornene (ENB) as the non-conjugated diene termonomer. Other common commercial EPDMs incorporating the termonomers dicyclopentadiene or 1,4-hexadiene are not as susceptible to such viscosity increases. For example, R. J. Hopper [Rubber Chem. Technol. 49, 341 (1976)] describes procedures for modification of an EPDM containing 1,4-hexadiene termonomer at levels of 0.13 to 0.38 moles of bound modifier per kilogram of modified EPDM. In these examples, the modifier was N-chlorothio-N-methyl-p-toluenesulfonamide. The modified polymers exhibited no viscosity or processability problems. In contrast, an attempt to modify an EPDM containing ENB termonomer according to these procedures resulted in severe crosslinking, rendering the product unprocessable [M. van Duin, J. C. J. Kraus and J. Smedinga, Kautsch. Gummi Kunstst. 46, 445 (1993)]. However, at a lower N-chloro-thiosulfonamide modification level, 0.0087 moles per kilogram, a processable modified EPDM containing ENB was obtainable [U.S. Pat. Nos. 3,915,907 and 3,970,133, Examples IX and XII].

A process for reacting N-chlorothio-sulfonamides with ethylene-(α-olefin)-non-conjugated diene terpolymers wherein the rate is accelerated by certain metal-containing catalysts is disclosed by White, Auda, Davis and Ferrughelli in U.S. Pat. No. 4,956,420. In this patent, EPDMs containing ENB as the termonomer are specifically excluded.

To achieve the most effective co-vulcanizability in blends with highly unsaturated rubbers, modification levels of greater than 0.05 mol/kg are preferred and 0.08–0.20 mol/kg most preferred. It is, therefore, of significant practical interest to provide a process by which ethylene-(α-olefin)-ENB terpolymers, particularly ethylene-propylene-ENB rubbery terpolymers may be modified with N-chloro(or bromo)thio-sulfonamides at the preferred levels, without encountering viscosity increases which prevent further processing. The object of this invention is to provide such a process.

SUMMARY OF THE INVENTION

In accordance with the present invention, there is provided a process for preparing an N-chloro(or bromo)thiosulfonamide-modified terpolymer which comprises reacting:

(a) a terpolymer of ethylene, an α-olefin containing from 3–16 carbon atoms, preferably propylene, and 5-ethylidene-2-norbornene (ENB) wherein the ENB content ranges from about 0.1 percent to about 15 percent based on the total weight of the said terpolymer, with (b) an N-chloro(or bromo)thio-sulfonamide of the formula:

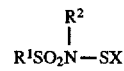

wherein $R^1$ and $R^2$ are selected from the group consisting of alkyl radicals having 1 to 20 carbon atoms, aralkyl radicals having 7 to 20 carbon atoms and aryl and substituted aryl radical having 6 to 10 carbon atoms and wherein $R^1$ is also selected from radicals having the formula:

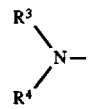

wherein $R^3$ and $R^4$ are individually selected from said alkyl, aralkyl, aryl and substituted aryl radicals and wherein $R^3$ and $R^4$ can be joined together to represent radicals selected from

where n is an integer of 4 to 7, and

wherein X is selected from chlorine and bromine; in the presence of at least a stoichiometric amount of a hydrohalic acid acceptor, said stoichiometry based on the assumption that for each molar equivalent of N-halothio-sulfonamide employed, one molar equivalent of hydrohalic acid will be produced.

Preferred acid acceptors comprise trialkyl amines, calcium or magnesium carbonates or the calcium or magnesium salts of saturated aliphatic carboxylic acids. More preferred as acid acceptors are the calcium or magnesium salts of saturated aliphatic carboxylic acids containing 6–30 carbon atoms. Most preferred are the calcium or magnesium salts of saturated fatty acids, e.g. calcium stearate. The latter are most preferred since the free fatty acid formed by reaction with hydrohalic acid is generally an ingredient (e.g., stearic acid) of the end-use rubber formulation.

The aforesaid reactions may be carried out in solution, wherein the rubber is dissolved in an inert organic solvent, or in the absence of a solvent, in a suitable internal mixer or extruder.

The present invention more specifically reveals a process for preparing an N-chlorothio-sulfonamide-modified terpolymer or an N-bromothio-sulfonamide-modified terpolymer which comprises reacting:

(a) a terpolymer which is comprised of repeat units which are derived from ethylene, an α-olefin containing from 3 to 16 carbon atoms, and 5-ethylidene-2-norbornene; and (b) an N-halothio-sulfonamide of the formula:

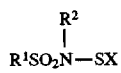

wherein $R^1$ and $R^2$ are selected from the group consisting of alkyl radicals having 1 to 20 carbon atoms, aralkyl radicals having 7 to 20 carbon atoms and aryl and substituted aryl radical having 6 to 10 carbon atoms and wherein $R^1$ is also selected from radicals having the formula:

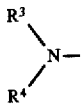

wherein $R^3$ and $R^4$ are individually selected from said alkyl, aralkyl, aryl and substituted aryl radicals and wherein $R^3$ and $R^4$ can be joined together to represent radicals selected from

where n is an integer of 4 to 7, and

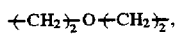

and wherein x is selected from chlorine and bromine; wherein said reaction is conducted in the presence of at least a stoichiometric amount of a hydrohalic acid acceptor.

DETAILED DESCRIPTION OF THE INVENTION

The terpolymers employed in the practice of this invention are comprised of ethylene, an α-olefin and 5-ethylidene-2-norbornene and can be substantially amorphous and can have a substantially random arrangement of at least the ethylene and α-olefin monomers. These terpolymers can be synthesized by the terpolymerization of ethylene, an α-olefin, and 5-ethylidene-2-norbornene with the repeat units in the terpolymer accordingly being derived from ethylene, the α-olefin, and 5-ethylidene-2-norbornene.

The terpolymer, prior to modification with N-chlorothio-sulfonamide (as described below) will generally have a weight average molecular weight (Mw) in the range between about 10,000 and 1,000,000 or higher, typically between about 15,000 and 500,000 and more typically between about 20,000 and 350,000.

Typically, the terpolymer is "substantially amorphous" and, when that term is used to define the terpolymer, it is to be taken to mean having a degree of crystallinity less than about 25 percent, preferably less than about 15 percent and more preferably less than about 10 percent as measured by means known in the art. Three major methods of determining crystallinity are based on specific volume, x-ray diffraction and infrared spectroscopy. Another well-established method, based on measurement of heat content as a function of temperature through the fusion range, is now easily carried out using differential scanning calorimetric measurements. It is known that these independent techniques are in good experimental agreement. However, it should also be recognized that a terpolymer which contains higher levels of crystallinity and, therefore, is other than substantially amorphous can also be modified by the invention disclosed herein.

Terpolymers useful in this invention will contain about 20 to about 90 weight percent ethylene, preferably about 30 to 85 weight percent ethylene and even more preferably about 35 to about 80 weight percent ethylene.

Alpha-olefins suitable for use in the preparation of the terpolymers are preferably $C_3$–$C_{16}$ alpha-olefins. Illustrative non-limiting examples of such alpha-olefins are propylene, 1-butene, 1-pentene, 1-hexane, 1-octene and 1-dodecene. The alpha-olefin content of the EPDM prior to modification is generally about 10 to about 80 weight percent, preferably about 20 to about 70 weight percent. The preferred alpha-olefin for the purposes of this invention is propylene.

The diene monomer of this invention is 5-ethylidene-2-norbornene (ENB). The total ENB content in the terpolymer is about 0.1 to about 15 weight percent, preferably 0.5 to about 12 weight percent and most preferably about 1.0 to about 9.0 weight percent.

The term N-halothio-sulfonamide includes reactants of the formula:

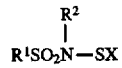

where X is chlorine or bromine, preferably chlorine (N-chlorothio-sulfonamide), hereinafter referred to as CTSA, where $R^1$ and $R^2$ are selected from the group consisting of alkyl radicals having 1–20 carbon atoms, aralkyl radicals having 7–20 carbon atoms, alkaryl radicals having from 7–20 carbon atoms and aryl and substituted aryl, e.g., haloaryl, radicals having 6–10 carbon atoms and where $R^1$ is also selected from radicals having the formula

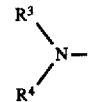

where $R^3$ and $R^4$ are individually selected from said alkyl, aralkyl and aryl and substituted aryl, e.g., haloaryl, radicals and where $R^3$ and $R^4$ can be joined together to represent radicals selected from

where n is an integer of 4 to 7, and

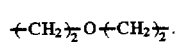

In the practice of this invention, for the N-chlorothio-sulfonamide, $R^1$ and $R^2$ are preferably selected from alkyl radicals having 1 to 6 carbon atoms, phenyl radicals, monoalkyl substituted phenyl radicals having from 7 to 10 carbon atoms and dialkylsubstituted phenyl radicals having from 8 to 11 carbon atoms where such alkyl substituent or substituents are radicals selected from the group consisting of methyl, ethyl and all isomeric forms of propyl and butyl radicals and from the p-chlorophenyl radical.

Representative of radicals suitable for $R^1$ are radicals selected from methyl, tert-butyl, cyclohexyl, 2-eicosyl, benzyl, 2-(p-n-undecylphenyl)-2-propyl, phenyl, 1-naphthyl, p-tolyl, 3-ethyl-4-(n-dodecyl)phenyl, p-chlorophenyl and 3-chloro-4-(n-butyl)phenyl radicals.

Representative of radicals suitable for $R^2$ are methyl, tert butyl, 1-eicosyl, cyclohexyl, benzyl, 1-(p-n-dodecylphenyl)-

1-ethyl, phenyl, 1-naphthyl, m-tolyl, 3,4-di-(n-heptyl) phenyl, p-bromophenyl and 3-chloro-4-(n-butyl)phenyl radicals.

Some representative examples of N-chlorothio-sulfonamides which can be used in the present invention are N-chlorothio-N-methylmethanesulfonamide, N-chlorothio-N-methyl-benzenesulfonamide, N-chlorothio-N-methyl-p-toluenesulfonamide, N-chlorothio-N-ethyl-p-toluenesulfonamide, N-chlorothio-N-methyl-ethanesulfonamide, N-chlorothio-N-phenyl-p-toluenesulfonamide, N-chlorothio-N-(2-propyl)-methanesulfonamide, N-chlorothio-N-(1-propyl)-p-chlorobenzenesulfonamide, N-chlorothio-N-phenyl-methanesulfonamide, N-chlorothio-N,N',N'-trimethylsulfamide, N-chlorothio-N-methyl-N',N'-(pentamethylene)-sulfamide, N-chlorothio-N-methyl-N',N'-diethylsulfamide and N-chlorothio-N-phenyl-benzenesulfonamide.

Representative examples of N-bromothiosulfonamides which can be employed as the N-halothio-sulfonamide in carrying out the process of this invention include N-bromothio-N-methylmethanesulfonamide, N-bromothio-N-methylbenzenesulfonamide, N-bromothio-N-methyl-p-toluenesulfonamide, N-bromothio-N-methylethanesulfonamide, N-bromothio-N-phenyl-p-toluenesulfonamide, N-bromothio-N-(2-propyl)-methanesulfonamide, N-bromothio-N-(1-propyl)-p-chlorobenzenesulfonamide, N-bromothio-N-phenylmethanesulfonamide, N-bromothio-N,N',N'-trimethylsulfamide, N-bromothio-N-methyl-N',N'-(pentamethylene)-sulfamide, N-bromothio-N-methyl-N',N'-diethylsulfamide and N-bromothio-N-phenylbenzenesulfonamide.

Chlorothio-sulfonamides suitable for use in the admixture of the present invention, as well as their preparation, have further been described in the patent literature. For example, West German DPS 1,156,403 shows the preparation of chlorothio-sulfonamides by reaction of a sulfonamide with $SCl_2$ in the presence of an organic acid acceptor.

West German DPS 1,101,407 shows the preparation of chlorothiosulfonamides from N,N'-dithiobis(sulfonamides) and chlorine or sulfuryl chloride. The chlorothio-sulfonamides of the present invention can be prepared by analogous procedures.

The preferred amount of CTSA added depends on the specific nature of the unsaturated (EPDM) polymer, the specific nature of the highly unsaturated polymer or polymers to be used in a blend of the two types of polymers, the specific cure system and the characteristics desired for the final vulcanizate. The ratio, (moles CTSA/moles unsaturated sites in the polymer) can be from about 0.03/1 to about 1/1, but is preferably in the range of about 0.15/1 to about 0.8/1 and more preferably about 0.2/1 to about 0.7/1.

In the prior art relating to the modification of EPDM with N-halothio-sulfonamides, acid acceptors have been employed. Their purpose was to neutralize any minor amounts of hydrohalic acid which formed as a result of hydrolysis of the N-halothio-sulfonamide by adventitious moisture. Sources could include atmospheric moisture and small amounts of process water remaining in commercial EPDM rubbers. In these cases, the molar equivalents of acid acceptors were only a fraction of the molar equivalents of N-halothio-sulfonamide. For example, in U.S. Pat. No. 4,910,266, 0.5 mmol (0.001 equivalent) of calcium carbonate was employed in a modification reaction using 0.028 mol of N-halothio-sulfonamide. In this example, the EPDM was an ethylene-propylene-1,4-hexadiene terpolymer.

The present invention differs from the prior art in that at least a full molar equivalent of hydrohalic acid acceptor is employed relative to the N-halothio-sulfonamide. Some discussion of the proposed reaction mechanism will be helpful in describing this phenomenon. It is, however, to be understood that this invention is not intended to be dependent on any offered theories of chemical or physical mechanisms.

The reaction of N-halothio-sulfonamides with EPDM containing ENB termonomer is different than with EPDMs containing the other common commercial termonomers 1,4-hexadiene (HD) or dicyclopentadiene (DCPD). With the latter two types, the N-halothio-sulfonamide undergoes a 1,2-addition to the residual olefinic bond of HD or DCPD. As a result, the sulfonamidothio radical becomes covalently bound to one olefinic carbon atom and the halo radical becomes covalently bound to the other. Evidence for this mechanism, based on model compounds, spectral data and elemental analyses has been published [Hopper, Rubber Chem. Technol., 49 341 (1976)]. In surprising contrast, it has now been discovered that with EPDMs containing ENB, a sulfonamidothio derived radical becomes covalently bound, but substantially all the halogen is eliminated in the form of hydrohalic acid. Hydrohalic acid apparently promotes the gelation of EPDMs containing ENB, causing viscosity increases which render the polymer unprocessable. By conducting the reaction in the presence of certain hydrohalic acid acceptors in amounts sufficient to neutralize the acid, the gelation is suppressed. The exact mechanisms by which the sulfonamidothio derived radial is attached and the hydrohalic acid eliminate are not fully understood. Nevertheless, the resulting modified EPDM terpolymers exhibit improved co-cure properties in blends with highly unsaturated rubbers.

In accordance with the present invention, suitable acid acceptors comprise trialkylamines wherein the alkyl groups can be the same or different and contain from 1–18 carbon atoms, calcium or magnesium carbonates and calcium or magnesium salts of saturate normal aliphatic carboxylic acids containing 2–30 carbon atoms or saturated or branched aliphatic carboxylic acids containing 4–30 carbon atoms. When the modification reaction is conducted in an internal mixer or extruder, in the absence of a solvent, the calcium or magnesium salts of normal or branched saturated aliphatic carboxylic acids of 8 to 28 carbon atoms are preferred. Calcium stearate, calcium laurate, magnesium palmitate and magnesium 2-ethylhexanoate are representative examples. Calcium stearate is especially preferred since its reaction as a hydrohalic acid acceptor produces stearic acid, a common ingredient in the end-use formulations.

The amount of hydrohalic acceptor employed in the practice of this invention is at least stoichiometrically equivalent to the moles of N-halothio-sulfonamide and preferable in 3–10 percent excess.

Coincidentally, in U.S. Pat. No. 4,956,420, the calcium and magnesium salts of carboxylic acids are claimed as co-catalysts for the reaction of N-halothio-sulfonamides with EPDM terpolymers, wherein those terpolymers containing ENB are specifically excluded. No inference is made to any role as acid acceptors and indeed the terpolymers claimed do not eliminate stoichiometric amounts of hydrohalic acids when reacted with N-halothio-sulfonamides.

The reactions of ethylene-(α-olefin)-ENB terpolymers with N-halothio-sulfonamides in the presence of at least a stoichiometrically equivalent amount of an acid acceptor may be carried out either in solution or by a melt phase (solventless) process. For solution processes, inert solvents such as hexane, heptane, cyclohexane, chloroform, benzene or toluene may be employed. In general, the acid acceptor is first dissolved or dispersed in the polymer-solvent medium, then the halothio-sulfonamide added. The reaction occurs more rapidly in the more polar solvents; e.g., chloroform or toluene are preferred over hexane or heptane. For melt phase processes, the acid acceptor is preferably first blended directly with the polymer, then the N-halothio-sulfonamide added in a suitable apparatus such as an internal mixer. Banbury® mixers, Brabender® mixers, Haake® mixers and extruder type mixers are suitable for this purpose.

For direct mixing, it can be advantageous to suspend or dissolve the CTSA in a relatively inert medium such as mineral oil or chlorinated paraffin in order to improve dispersion as well as minimize hydrolysis by atmospheric moisture. It is particularly important that the reaction be carried out using reactants (rubber, CTSA) and diluents, if any, which have been thoroughly and uniformly dried to avoid erratic reactivity and/or the formation of undesirable by-products due to hydrolysis of CTSA and the formation of $SO_2$, HCl and elemental sulfur. In the most preferred procedure, all traces of moisture are removed. As a practical matter, in view of large scale production and handling, it is preferred that polymer moisture be less than about 0.1 weight percent, more preferably less than about 0.05 weight percent, most preferably less than about 0.02 weight percent.

The reaction is preferably carried out at the lowest temperature commensurate with the extent of reaction desired and in view of reasonable reaction times as well as polymer processing/flow and polymer degradation, particularly when the reaction is conducted in the melt. Solution reaction can be carried out at from about 10° C. to about 125° C., preferably about 20° C. to about 80° C., with ambient temperature being convenient and practical. Reactions conducted in the melt phase are preferably carried out at about 40° C. to about 170° C.; more preferably about 50° C. to about 150° C.; most preferably about 60° C. to about 130° C.

This invention is illustrated by the following examples which are intended to be representative rather than restrictive of the scope of the invention. Commercial EPDM rubbers produced by Uniroyal Chemical Company were employed in the examples. The specific rubbers and their typical properties (as published in the Polysar "EPM/EPDM Product Selection Guide, Sep. 16, 1985) were Royalene® 505 (8.5 weight percent ENB; 57 weight percent ethylene; Mooney viscosity, ML 1+8 at 100° C., 73) and Royalene® 501 (3.7 weight percent ENB; 56 weight percent ethylene; Mooney viscosity, ML 1+8 at 100° C., 53). In the examples, N-chlorothio-N-methyl-benzenesulfonamide (CTMBS) is employed. The approximate extent of modification is expressed as moles of chemically-bound sulfonamidothio derived radical per kilogram of modified EPDM, assuming the chloro radical was eliminated as hydrochloric acid. The moles/kg may be estimated from nitrogen and sulfur analysis or infrared spectroscopy. For CTMBS modified ethylene-propylene-ENB terpolymers, absorbance bands, not in the original EPDM, appear at 572, 639, 688, 752, 1091 and 1162, $cm^{-1}$.

For examples I–IV, 80 g of Royalene 505® was dissolved, under nitrogen, in 1 L of hexane, heated to reflux to azeotropically remove any residual water and cooled to ambient temperature. Based on evaporation of solvent from a weighed sample, the rubber content was determined to be 11.2 weight percent.

COMPARATIVE EXAMPLE I

To 94.75 g of hexane solution (10.99 g EPDM) in a screw capped jar was added 0.014 g (0.075 millimole) of tri(n-butyl)amine in 5 ml of dichloromethane, and 0.26 g (1.09 millimole) of N-chlorothio-N-methylbenzene sulfonamide (CTMBS) in 10 ml of dichloromethane. The jar was repurged with nitrogen, capped and magnetically stirred at ambient temperature. Within 15 minutes, the viscosity had visually increased. After overnight reaction, the contents of the jar consisted of a completely immobile mass of gel. A moistened strip of pH indicator paper inserted into the head space above the gel showed a pH of less than 3. In this experiment, tributyl amine, present at a concentration of 6.9 mole percent relative to CTMBS was insufficient to prevent gel or evolution of a strong acid.

COMPARATIVE EXAMPLE II

The reaction was carried out essentially as Example I except with 87.7 g of hexane solution, 0.10 g (0.539 millimole) tri(n-butyl)amine in 10 ml dichloromethane and 0.35 g (1.47 millimole) CTMBS in 10 ml dichloromethane. After 1.5 hours at ambient temperature, the solution had gelled to an immobile mass. In this example, 36 mol percent tributylamine relative to CTMBS was insufficient to prevent gelation.

EXAMPLE III

The reaction was carried out essentially as Example I except with 94.6 g of hexane solution, 0.313 g (1.69 millimole) tri(n-butyl)amine in 10 ml of dichloromethane, and 0.39 g (1.64 millimole) CTMBS in 10 ml of dichloromethane. After stirring three hours at ambient temperature, an aliquot of a few ml was removed and a purified sample of the rubber isolated by coagulation and washing with acetone. The remainder of the reaction solution was stirred a total of 20 hours. The final rubbery product was then isolated by coagulation and washing with acetone, followed by drying under vacuum. Contrary to comparative Examples I and II, no gel formation was observed. The infra spectra of the 3-hour and 20-hour samples were essentially identical, indicating the reaction was complete within three hours. Analysis of the final rubbery product gave 0.16 percent nitrogen, 0.60 percent sulfur and less than 0.004 percent chlorine. From these data, it is calculated that the modified EPDM product contains 0.10±0.01 mol of chemically bound sulfonamidothio derived radical per kilogram and virtually no bound chlorine. In this example, 103 mole percent of tri(n-butyl) amine relative to CTMBS prevented the formation of gel.

EXAMPLE IV

The reaction was carried out essentially as Example I except with 88.0 g of hexane solution, 0.911 g (1.50 millimole, 3.00 milliequivalent) of calcium stearate suspended in 10 ml of dichloromethane and 0.475 g (2.00 millimole) CTMBS in 10 ml of dichloromethane. After four hours stirring at ambient temperature, several ml were removed and the rubbery product isolated and analyzed by infrared spectroscopy. After three days stirring at ambient temperature, the final rubbery product was isolated. The infrared spectra indicated that the reaction was essentially complete within the first four hours. Even with the prolonged additional exposure to the reaction medium, the rubber did not gel. A sample for elemental analysis was prepared by filtering a chloroform solution of the final rubbery product to remove a trace of cloudiness (believed to be calcium chloride), then evaporating the chloroform. The analysis gave 0.23 percent nitrogen, 1.00 percent sulfur and less than 0.003 percent chlorine. From these data, it is calculated that the modified EPDM product contains 0.16±0.005 mol of chemically bound sulfonamidothio derived radical per kilogram and virtually no bound chlorine.

EXAMPLE V

The apparatus was a 420 cc stainless steel Brabender Prep Mixer equipped with cam rotors, an oil cooled jacket and a nitrogen purge through a port in the bottom of the ram. The mixer was powered by a Brabender EPL-V5501 variable speed drive unit capable of measuring mixing torque. Royalene® 505 was cut into about ⅛-inch thick slabs and dried in a circulating air oven, one week at 40° C., prior to use. With the jacket oil at 60° C. and the rotors at 60 rpm, 210 g of the dried Royalene, 8.9 g (0.0147 mol, 0.029 equivalents) of calcium stearate and 0.9 g of stearic acid were added. A nitrogen purge was begun and mixing continued until the batch reached 115° C. Then 6.7 g (0.028 mole) of CTMBS was added over 2.5 minutes (to 123° C.) and the batch subsequently mixed 1 minute at 60 rpm, 5 minutes at 50 rpm (to 131° C.), discharged and cooled in ambient air. As a result of CTMBS addition, the mixing torque increased from 12,400 m-g to 14,800 m-g. The product Mooney viscosity, ML 1+8 at 100° C. was 101 versus 73 for the starting material. Although such a viscosity increase is not preferred, the product was soluble (ungelled in solvents, and processable in blends with, e.g. natural rubber). A sample for analysis was purified by dissolving in chloroform, coagulating in hot methanol and washing with acetone, then repeating the sequence, and drying under vacuum. Elemental analysis showed 0.61 percent sulfur, 0.12 percent nitrogen and less than 0.06 percent chlorine. From these data, it is calculated that the modified EPDM product contains 0.09±0.01 mol of chemically bound sulfonamidothio derived radical per kilogram.

EXAMPLE VI

The procedure was essentially the same as for Example V except that Royalene® 501, containing about 0.7 weight percent residual moisture was employed in place of Royalene® 505. CTMBS was added at 110° C. and the batch discharged at 125° C. Mixing torque (12,400 m-g) did not increase as a result of CTMBS addition. The product Mooney viscosity, ML 1+8 at 100° C. was 48 versus 53 for the starting material. Analysis of a purified product sample showed 0.08±0.01 mol/kg. This example illustrates that, even though water is detrimental to the desired modification, its presence does not preclude the practice of the invention. Also illustrated is the observation that EPDM terpolymers with lower ENB contents are less susceptible to viscosity increases and are thus preferred.

EXAMPLE VII

A stirred solution of 60 g Royalene® 501 in 500 ml of toluene was refluxed under nitrogen in a 1 liter flask equipped with a condenser and Dean-Stark trap. About 0.4 ml of water were collected in the trap. The resulting dried solution was cooled to ambient temperature and stirred under a blanket of nitrogen. To this was added a suspension of 2.61 g (4.30 millimoles, 8.60 milliequivalents) of calcium stearate in 20 ml dichloromethane and stirred 10 min to disperse. Next, a solution of 1.93 g (8.12 millimole) of CTMBS in 20 ml of dichloromethane was added and the mixture stirred 1 hour and allowed to stand overnight. The rubber solution was coagulated by mixing with 300 ml of methanol containing 1 g of Wingstay® K antioxidant. The solvents were decanted and the rubber mixed with 300 ml of methanol containing 1 g of Wingstay® K antioxidant and stirred while heating to the boil. The hot solvents were decanted and the rubber soaked 2.5 hours in 300 ml acetone containing 1 g of Wingstay® K antioxidant. The solvents were decanted and 500 ml fresh acetone containing 1 g Wingstay® K antioxidant was added. After soaking 3.5 hours, the solvents were decanted and the rubber dried under vacuum. FTIR analysis of the product showed 0.12±0.01 mol/kg of chemically bound sulfonamidothio derived radical (92 percent conversion).

EXAMPLE VIII

A stirred solution of 60 g of Royalene® 501 in 500 ml of toluene was azeotropically dried as in Example VII, then cooled to ambient temperature. By evaporation of solvent from a weight sample, the rubber content was determined to be 12.0 weight percent. A 61.7 g portion of the this solution (7.4 g of rubber) was transferred to an 80 ml screw capped jar containing a magnetic stirrer bar. To this was added 0.047 g (0.47 millimoles, 0.94 milliequivalent) of calcium carbonate suspended in 2 ml of dry toluene, followed by 0.10 g of stearic acid in 2 ml of dry toluene. The bottle was purged with nitrogen, capped and thoroughly mixed by shaking, tumbling and magnetic stirring. Then, 0.21 g (0.88 millimole) of CTMBS in 3 ml of dry toluene was added and the jar purged with nitrogen, capped and stirred at ambient temperature for two days with no evidence of gelation. Infrared spectroscopic analysis of a purified sample gave 0.09±0.01 mol of chemically bound sulfonamidothio derived radical per kilogram.

COMPARATIVE EXAMPLE IX

A 57.6 g portion of the starting solution of Example VIII (6.9 g of rubber) was mixed with 0.267 g (0.87 millimole) of sodium stearate, 0.025 g of stearic acid and 0.196 g (0.82 millimole) of CTMBS essentially according to the procedure of Example VIII. No gel formation was observed after two days. Infrared spectroscopic analysis of a purified sample detected virtually no chemically bound sulfonamidothio derived radical, illustrating the unsuitability of alkali metal carboxylates as acid acceptors.

EXAMPLE X

The co-cure characteristics of the modified rubber products of Examples VI and VII were evaluated in a blend with natural rubber and the results summarized in the Table. For comparison a control of their unmodified counterpart, Royalene® 501, is included. For further comparison, an EPDM containing 1,4-hexadiene termonomer (Nordel® 1470, DuPont Co) and its modified derivative (Mod-1470) are also included. Mod-1470 was prepared by reaction of CTMBS with Nordel® 1470 in the presence of stearic acid in a Brabender® Prep Mixer according to U.S. Pat. No. 4,910, 206 and was composed of (in parts by weight): 100 Nordel® 1470, 2.9 chemically bound CTMBS, 0.1 non-bound CTMBS residues, 0.04 calcium carbonate, 3.5 stearic acid.

The ratio of EPDM to natural rubber (approximately 70:30) corresponds to that previously determined to be well suited for the assessment of co-curability of blends of EPDM with highly unsaturated diene rubbers [Hopper, Rubber Chem. Technol., 49, 341 (1976)]. In the individual recipes, any deviation from 70 parts of EPDM is due to added components (modifier, stearic acid, etc). Likewise, any deviation from three parts of stearic acid is to compensate for that already contained in the EPDM.

The recipes were mixed in a miniature internal mixer (Haake Rheomix 750) of about 78 cc internal volume, with batch sizes adjusted to provide an approximate fill factor of 70 percent. A non-productive batch consisting of the rubbers, carbon black and Wingstay® 100 antioxidant was mixed at 80 rpm to a temperature of about 130° C. After cooling, the non-productive batches were mixed with the remaining ingredients at 70 rpm for 3.5 minutes with cooling to keep the batch temperatures below 103° C.

Vulcanization characteristics were evaluated with a Monsanto oscillating disk rheometer (ODR) at 150° C., 1° arc and 100 cycles per minute according to ASTM D-2084. Tensile properties were determined essentially according to ASTM D-412 on specimens cured 1.2×t'90 minutes at 150° C. Tangent delta was obtained on an Autovibron™ Dynamic Viscoelastometer (Imass, Inc) at 75° C. and 11 Hz. Indicative of improved co-cure are higher values for the ODR torque increase ($M_H - M_L$), higher tensile strength and 300 percent modulus and lower hysteresis (tangent delta). As the Table illustrates, the examples of this invention meet these criteria and compare favorably with the Mod-1470.

TABLE

| Ingredient (parts by weight) | 1 | 2 | 3 | 4 | 5 |
|---|---|---|---|---|---|
| Royalene 501 | 70.0 | | | | |
| Example VI Product | | 75.5 | | | |
| Example VII Product | | | 72.1 | | |
| Nordel 1470 | | | | 70.0 | |
| Mod-1470 | | | | | 74.9 |
| Natural Rubber | 30.0 | 30.0 | 30.0 | 30.0 | 30.0 |
| N-550 Carbon Black | 30.0 | 30.0 | 30.0 | 30.0 | 30.0 |
| Wingstay 100 | 1.0 | 1.0 | 1.0 | 1.0 | 1.0 |
| Stearic Acid | 3.0 | — | 3.0 | 3.0 | 0.42 |
| Zinc Oxide | 4.0 | 4.0 | 4.0 | 4.0 | 4.0 |
| Sulfur | 1.5 | 1.5 | 1.5 | 1.5 | 1.5 |
| TBBS$^a$ | 1.0 | 1.0 | 1.0 | 1.0 | 1.0 |
| TMTD$^b$ | 0.05 | 0.05 | 0.05 | 0.05 | 0.05 |
| ODR: | | | | | |
| $t_{s2}$, minutes | 6.1 | 4.9 | 6.6 | 6.6 | 6.8 |
| t'90, minutes | 17.5 | 20.5 | 25.2 | 24.1 | 24.8 |
| $M_L$, dN · m | 5.7 | 6.7 | 6.9 | 9.4 | 10.3 |
| $M_H - M_L$, dN · m | 26.6 | 32.6 | 33.9 | 18.5 | 32.2 |
| Physical Properties: | | | | | |
| Tensile, MPa | 9.5 | 15.8 | 17.4 | 11.0 | 15.2 |
| Elongation, % | 536 | 485 | 465 | 786 | 450 |
| 300% Modulus, MPa | 5.63 | 8.78 | 9.37 | 3.95 | 9.00 |
| Autovibron: | | | | | |
| Tangent Delta | 0.119 | 0.081 | 0.075 | 0.120 | 0.063 |

$^a$N-tert-butyl-2-benzothiazole sulfenamide
$^b$Tetramethylthiuram disulfide

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing an N-chlorothio-sulfonamide-modified terpolymer which comprises reacting:

(a) a terpolymer which is comprised of repeat units which are derived from ethylene, propylene, and 5-ethylidene-2-norbornene; wherein the terpolymer has a 5-ethylidene-2-norbornene content which is within the range of about 0.1 percent to about 15 percent, based upon the total weight of the terpolymer, wherein the terpolymer has an ethylene content which is within the range of about 20 percent to about 90 percent, based upon the total weight of the terpolymer; wherein the terpolymer has an propylene content which is within the range of about 10 percent to about 80 percent, based upon the total weight of the terpolymer; wherein the terpolymer has a weight average molecular weight which is within the range of about 10,000 to about 1,000,000; and wherein the terpolymer has a degree of crystallinity of less than about 25 percent; and (b) an N-chlorothio-sulfonamide selected from the group consisting of N-chlorothio-N-methyl-methanesulfonamide, N-chlorothio-N-methyl-benzenesulfonamide, N-chlorothio-N-methyl-p-toluenesulfonamide, N-chlorothio-N-ethyl-p-toluenesulfonamide, N-chlorothio-N-methyl-ethanesulfonamide, N-chlorothio-N-phenyl-p-toluenesulfonamide, N-chlorothio-N-(2-propyl)-methanesulfonamide, N-chlorothio-N-(1-propyl)-p-chlorobenzenesulfonamide, N-chlorothio-N-phenyl-methanesulfonamide, N-chlorothio-N,N',N'-trimethylsulfamide, N-chlorothio-N-methyl-N',N'-(pentamethylene)-sulfamide, N-chlorothio-N-methyl-N',N'-diethylsulfamide and N-chlorothio-N-phenylbenzenesulfonamide; wherein said reaction is conducted in the presence of at least a stoichiometric amount of a hydrohalic acid acceptor: wherein the reaction between the terpolymer and the N-chlorothio-sulfonamide is conducted in an internal mixer or an extruder in the absence of a solvent, wherein the molar ratio of the N-chloro-thiosulfonamide to double bonds in the terpolymer is within the range of about 0.03:1 to about 1:1, and wherein the hydrohalic acid acceptor is selected from the group consisting of calcium salts of normal aliphatic carboxylic acids containing from about 8 to about 28 carbon atoms, calcium salts of branched aliphatic carboxylic acids containing from about 8 to about 28 carbon atoms, magnesium salts of normal aliphatic carboxylic acids containing from about 8 to about 28 carbon atoms, and magnesium salts of branched aliphatic carboxylic acids containing from about 8 to about 28 carbon atoms.

2. A process as specified in claim 1 wherein the hydrohalic acid acceptor is selected from the group consisting of calcium stearate, calcium laurate, calcium palmitate, calcium 2-ethylhexanoate, magnesium stearate, magnesium laurate, magnesium palmitate, and magnesium 2-ethylhexanoate.

3. A process as specified in claim 1 wherein the hydrohalic acid acceptor is calcium stearate.

* * * * *